(12) United States Patent
Sade et al.

(10) Patent No.: US 8,239,645 B1
(45) Date of Patent: Aug. 7, 2012

(54) MANAGING MIRRORING IN DATA STORAGE SYSTEM HAVING FAST WRITE DEVICE AND SLOW WRITE DEVICE

(75) Inventors: Gilad Sade, Newtown, MA (US); Walter A. O'Brien, III, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 435 days.

(21) Appl. No.: 11/904,868

(22) Filed: Sep. 28, 2007

(51) Int. Cl.
*G06F 13/00* (2006.01)
(52) U.S. Cl. .............. 711/162; 711/112; 711/E12.019
(58) Field of Classification Search .............. None
See application file for complete search history.

(56) References Cited

U.S. PATENT DOCUMENTS

| | | | |
|---|---|---|---|
| 6,952,794 B2 * | 10/2005 | Lu | 714/7 |
| 2002/0156972 A1 * | 10/2002 | McKnight et al. | 711/114 |
| 2003/0093633 A1 * | 5/2003 | Thiesfeld et al. | 711/154 |
| 2005/0038963 A1 * | 2/2005 | Royer | 711/133 |
| 2006/0004957 A1 * | 1/2006 | Hand et al. | 711/113 |
| 2007/0016725 A1 * | 1/2007 | Chu et al. | 711/113 |
| 2007/0192538 A1 * | 8/2007 | Dawkins | 711/114 |
| 2008/0059699 A1 * | 3/2008 | Kubo et al. | 711/114 |
| 2008/0086585 A1 * | 4/2008 | Fukuda et al. | 711/100 |
| 2009/0327603 A1 * | 12/2009 | McKean et al. | 711/114 |

\* cited by examiner

*Primary Examiner* — Edward Dudek, Jr.
*Assistant Examiner* — Sean D Rossiter
(74) *Attorney, Agent, or Firm* — Krishnendu Gupta; Jason A. Reyes; Deepika Bhayana

(57) ABSTRACT

A method is used in managing mirroring in data storage system having a fast write device and a slow write device. A write I/O is received and is executed on the fast write device which includes a solid state drive. The write I/O is stored in interim storage having high performance sequential write capability. It is indicated that execution of the write I/O is complete. Based on the interim storage, the write I/O is executed on the slow write device.

11 Claims, 3 Drawing Sheets

MANAGING MIRRORING IN DATA STORAGE SYSTEM HAVING FAST WRITE DEVICE AND SLOW WRITE DEVICE

TECHNICAL FIELD

This invention relates to managing mirroring in data storage system having a fast write device and a slow write device.

BACKGROUND

Storage devices are employed to store data that are accessed by computer systems. Examples of basic storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller. A storage device may also be accessible over a network. Examples of such a storage device include network attached storage (NAS) and storage area network (SAN) devices. A storage device may be a single stand-alone component or be comprised of a system of storage devices such as in the case of Redundant Array Of Inexpensive Disks (RAID) groups.

For mission-critical applications requiring high availability of stored data, various techniques for enhancing data reliability are typically employed. One such technique is to provide a "mirror" for each storage device. In a mirror arrangement, data are written to at least two storage devices. Thus, data may be read from either of the two storage devices so long as the two devices are operational and contain the same data. That is, either of the two storage devices may process read requests so long as the two devices are in synchronization.

When one of the storage devices fails, its mirror may be used to continue processing read and write requests.

In general, a data replication system can provide an up-to-the-minute duplicate copy or replica of changing data on a storage device. Write commands issued to a primary storage device are duplicated and issued to the data replication system, which records the written data in its own storage medium. Sophisticated data replication systems store not only a current duplicate copy of the primary device but also allow additional past-time images of the primary device to be accessed. This may be done through "journaling," where the write commands themselves are archived, rather than simply a copy of the data.

Sometimes, however, communication to the data replication system is lost. This may be for a variety of reasons. For example, a physical connection with the device hosting the data replication system may be broken, or communication software may malfunction. When this happens, a data replication system will be out of synchronization with the primary storage device. Some reconciliation process is necessary to restore synchronization between the data replication system and the primary storage device.

Performing this reconciliation well is not a trivial task. One easy way to reconcile a primary storage device with its data replication system is simply to temporarily take the primary storage device out of service and copy the contents of the primary storage device to the data replication system. It is an undesirable technique, as it requires taking the primary storage out of service.

Another way to reconcile the two storage systems is to temporarily (while the data replication system is unavailable) store the duplicated write commands in an auxiliary journal, then "replay" the write commands for the data replication system when it comes back up.

As is known in the art, large host computer systems require large capacity data storage systems. These large computer systems generally include data processors which perform many operations on data introduced to the computer system through peripherals including the data storage system. The results of these operations are output to peripherals, including the storage system.

One type of data storage system is a magnetic disk storage system. Here a bank of disk drives and the computer system are coupled together through an interface. The interface includes "front end" directors (or controllers) and "back end" disk directors (or controllers, also known as rear end directors or disk directors). The interface operates the directors in such a way that they are transparent to the computer. That is, data is stored in, and retrieved from, the bank of disk drives in such a way that the computer system merely thinks it is operating with one large memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the front-end directors and disk directors, an addressable global cache memory. The global cache memory is a semiconductor memory connected to all of the front end directors and back end directors and is provided to rapidly store data from the computer system before storage in the disk drives, and, on the other hand, store data from the disk drives prior to being sent to the computer. The cache memory being a semiconductor memory, as distinguished from a magnetic memory as in the case of the disk drives, is much faster than the disk drives in reading and writing data.

In operation, when the host computer wishes to store end-user (i.e., host computer) data at an address, the host computer issues a write request to one of the front-end directors to perform a write command. One of the front-end directors replies to the request and asks the host computer for the data. After the request has passed to the requesting one of the front-end directors, the director determines the size of the end-user data and reserves space in the cache memory to store the request. The front-end director then produces control signals for such front-end director. The host computer then transfers the data to the front-end director. The front-end director then advises the host computer that the transfer is complete. The front-end director looks up in a Table, not shown, stored in the cache memory to determine which one of the rear-end directors is to handle this request. The Table maps the host computer address into an address in the bank of disk drives. The front-end director then puts a notification in a "mail box" (not shown and stored in the cache memory) for the rear-end directOr which is to handle the request, the amount of the data and the disk address for the data. Other rear-end directors poll the cache memory when they are idle to check their "mail boxes". If the polled "mail box" indicates a transfer is to be made, the rear-end director processes the request, addresses the disk drive in the bank, reads the data from the cache memory and writes it into the addresses of a disk drive in the bank. When end-user data previously stored in the bank of disk drives is to be read from the disk drive and returned to the host computer, the interface system operates in a reciprocal manner. The internal operation of the interface (e.g. "mail-box polling", event flags, data structures, device tables, queues, etc.) is controlled by interface state data (sometimes referred to as metadata) which passes between the directors through the cache memory. Further, end-user data is transferred through the interface as a series of multi-word transfers, or bursts. Each word transfer in a multi-word transfer is here, for example, 64 bits. Here, an end-user data transfer is made up of, for example, 32 bursts. Each interface state data word is a single word having, for example, 64 bits.

As is also known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer (e.g., here, a back end director) along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

The host computer, which for some purposes may include the storage system itself, may not address the disk drives of the storage system directly, but rather access to data may be provided to one or more host computers from what the host computers view as a plurality of logical devices or logical volumes (LVs), also referred to as LUNs. The LUNs may or may not correspond to the actual disk drives. For example, one or more LUNs may reside on a single physical disk drive. In another example, a LUN may use storage space from multiple physical disk drives. An LV or LUN (logical unit number) may be used to refer to the foregoing logically defined devices or volumes.

In the industry there have become defined several levels of RAID systems. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

In at least some cases, when a LUN is configured so that its data is written across multiple disk drives in the striping technique, the LUN is operating in RAID-0 mode. Alternatively, if the LUN's parity information is stored on one disk drive and its data is striped across multiple other disk drives, the LUN is operating in RAID-3 mode. If both data and parity information are striped across multiple disk drives, the LUN is operating in RAID-5 mode.

Advances in semiconductor technology have lead to an increase in the use of a semiconductor solid state drive (also known as a solid state disk or SSD) which uses a flash memory as a storage device, in areas such as computer systems. Thus, in at least some cases there seems to be a trend towards the use of an SSD as a storage device instead of a magnetic disk. In spite of having features such as, for example, a relatively small storage capacity and a relatively high price, the SSD has some other features that can make it more attractive as a storage device than the conventional magnetic disk in at least some cases.

Features that can make SSDs preferable as storage devices are, for example, a fast access rate, high throughput, a high integration density, and stability against an external impact. SSDs can move much larger amounts of data and process far more I/O requests, per time period, than conventional magnetic disks. This allows users to complete data transactions much more quickly.

Furthermore, advances in manufacturing technologies for SSDs may reduce the production costs of SSDs and also increase the storage capacities of SSDs. These developments may provide further incentive to use SSDs in place of magnetic disks in at least some cases.

Solid state disk systems may also comprise communication controllers, such as Fibre Channel (FC) controllers, Ethernet mechanisms, ATA or serial ATA interfaces, or SCSI controllers for managing data communication with external computing devices.

SUMMARY

A method is used in managing mirroring in data storage system having a fast write device and a slow write device. A write I/O is received and is executed on the fast write device which includes a solid state drive. The write I/O is stored in interim storage having high performance sequential write capability. It is indicated that execution of the write I/O is complete. Based on the interim storage, the write I/O is executed on the slow write device.

One or more implementations of the invention may provide one or more of the following advantages.

An SSD can be mirrored without incurring excessive cost or performance loss. A data storage system relying on redundancy can take advantage of an SSD without requiring redundant SSDs.

The details of one or more embodiments of the invention are set forth in the accompa-nying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

In a technique as described below, mirroring is provided for an SSD. In particular, mirroring protection (e.g., RAID-1) is provided where one copy is SSD-based and the other copy is LUN-based residing on one or more conventional hard disks.

Figure 2:
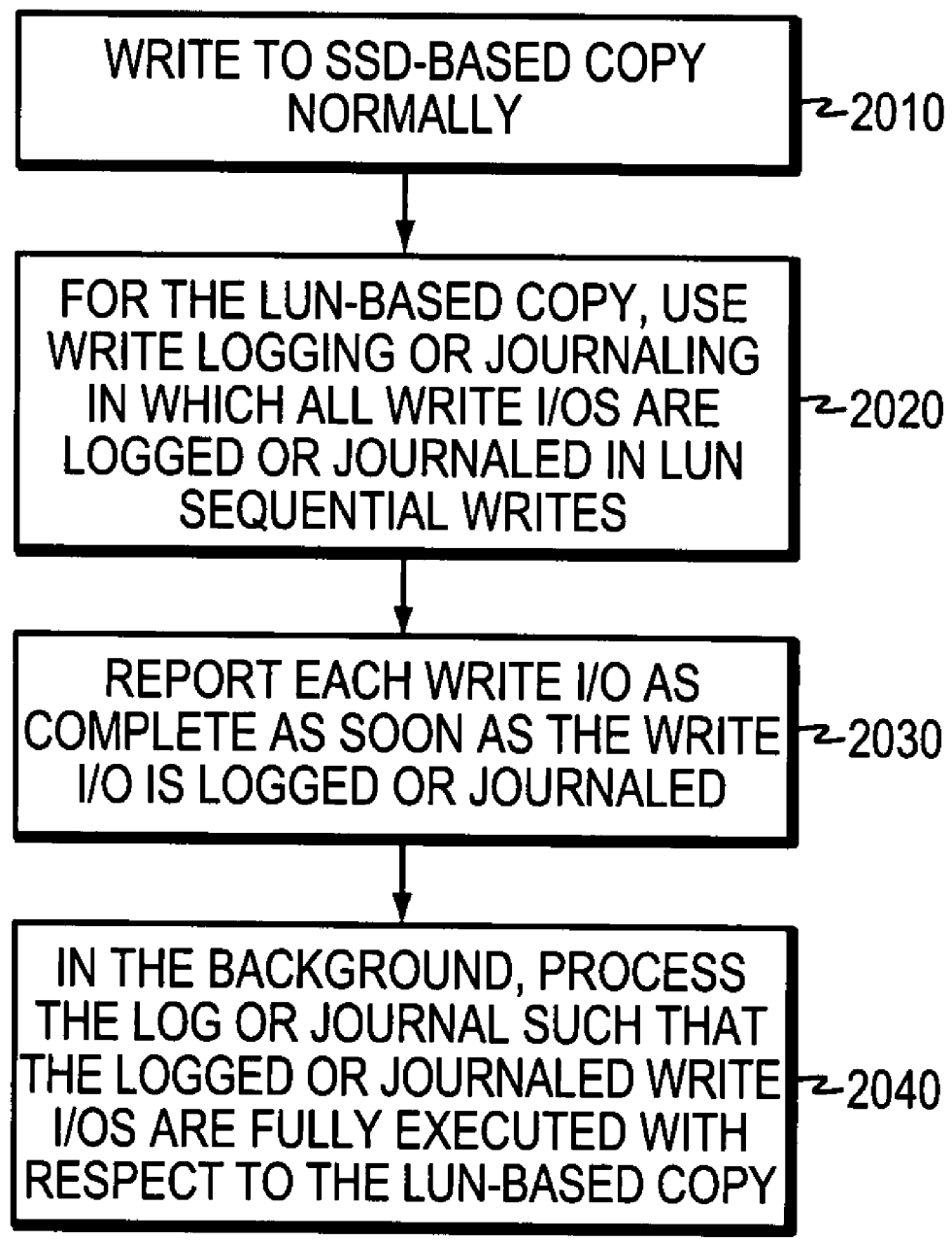
FIG. 2 is a flow diagram of a procedure that may be used with the data storage system of FIG. 1.

To achieve SSD performance, all read I/Os are serviced from the SSD. Since write I/Os must be applied to both copies, and since the SSD is much faster than a hard disk, especially on random writes, it is useful to match the speeds as much as possible. FIG. 2 illustrates one implementation of the technique. The SSD-based copy is written to normally (step 2010), but for the LUN-based copy, write logging or journaling is used in which all write I/Os are logged or journaled in LUN sequential writes (step 2020), which may be performed at the same speed or nearly the same speed as SSD writes. Thus, each write I/O is reported (e.g., to a host computer originating the write I/O) as complete as soon as the write I/O is logged or journaled (step 2030), because the log or journal thereby provides mirrored protection for the write I/O that was written to the SSD copy. In the background, e.g., at idle times or when I/Os are occurring less frequently, the log or journal is processed such that the logged or journaled write I/Os are fully executed with respect to the LUN-based copy (step 2040), so that the LUN-based copy makes progress toward "catching up" with the SSD-based copy.

An advantage of the technique is that it provides the SSD with the protection of redundancy but without incurring the high cost of a second SSD and without excessive adverse effect on performance.

Figure 1:
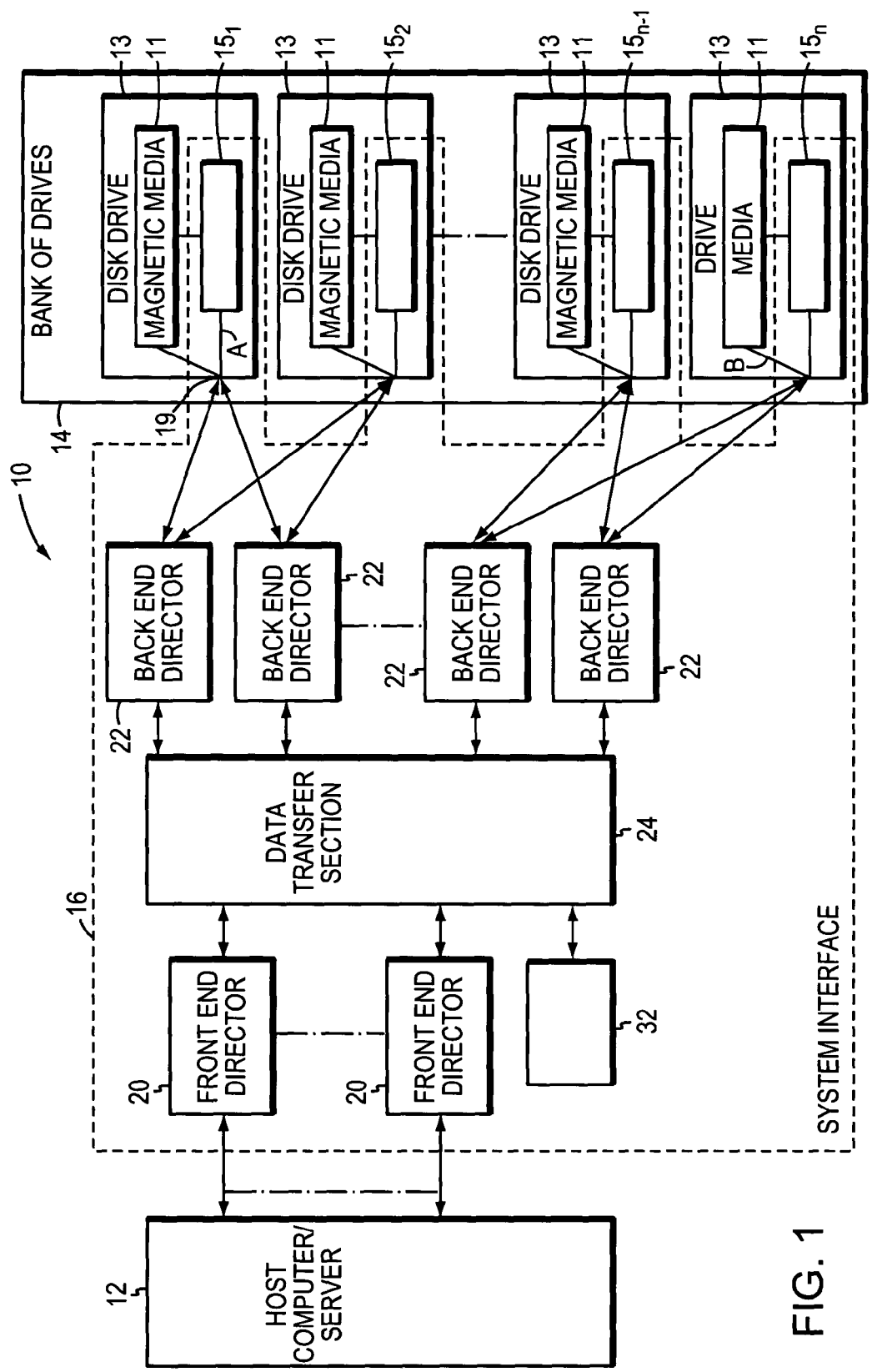
FIG. 1 is a block diagram of a data storage system that may be used with the invention.

FIG. 1 illustrates an example data storage system 10 in which the technique may be implemented. Data storage system 10 has a host computer/server 12 coupled to a bank of disk drives 14 through a system interface 16. The interface 16 comprises: a plurality of front-end directors 20 coupled to the host computer/server 12; a plurality of back end directors 22 coupled to the bank of disk drives 14; drive controllers 15₁-15ₙ, and a global cache memory. The interface may also comprise memory or drive 32 as described in more detail below. The interface 16 also includes a data transfer section 24 coupled to the plurality of front and back end directors 20, 22. The front-end directors 20 and the back end directors 22 control, the transfer of user data between the host computer/ server and bank of disk drives as such user data passes through the data transfer section. The interface may be used, for example, to present one or more LUNs to the system or to the host computer wherein each LUN operates in a RAID mode using storage space from one or more of the disk drives 14.

Figure 3:
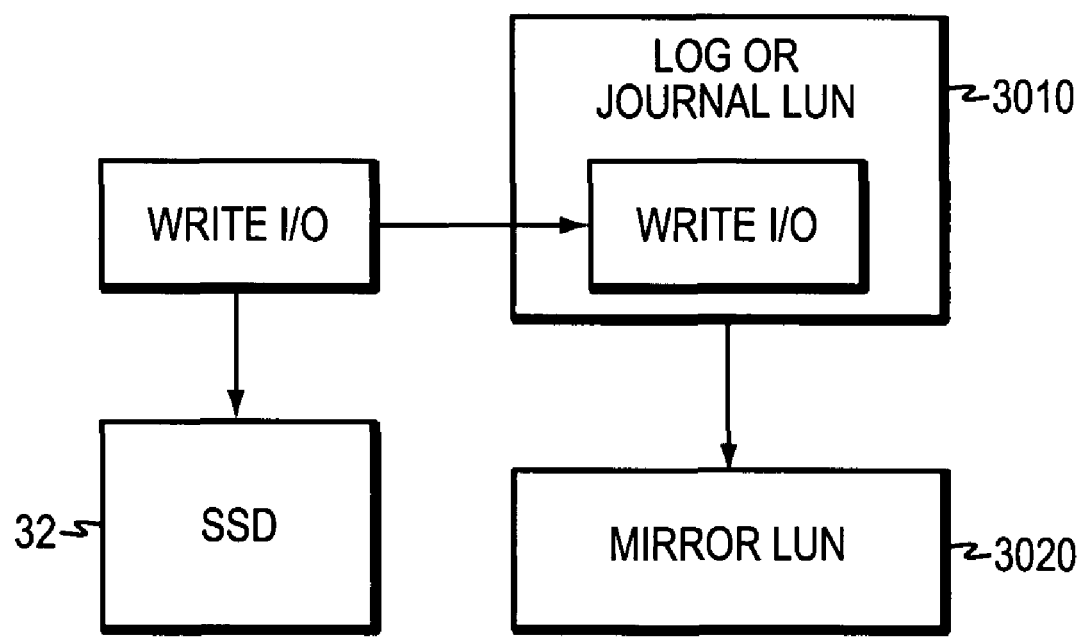
FIG. 3 is a diagram of example data flows for use with the procedure of FIG. 2 and system of FIG. 1.

FIG. 3 illustrates an example embodiment of data flows in accordance with the technique, with reference also to FIG. 1. An external write request (I/O) is sent from host computer/ server 12 to system 10. System 10 stores the request's user data in an SSD attached as memory or drive 32. System 10 also logs or journals the write request in LUN 3010 which is based on drives 14. A write completion indication is sent to host computer/server 12. In the background, e.g., at idle times or when I/Os are occurring less frequently, the write requests logged or journaled in LUN 3010 are processed such that the write requests are implemented in another LUN 3020 which is also based on drives 14 and which serves as the ultimate mirror copy of SSD 32. In at least some cases, this embodiment performs best when LUN 3010 operates in a RAID mode that has high sequential write performance (e.g., RAID-5).

In another embodiment, the SSD is attached as drive 13A having solid state memory media 11A, and the remaining drives 13 are conventional magnetic hard disks. An external write request (I/O) is sent from host computer/server 12 to system 10. System 10 stores the request's user data in SSD 13A. System 10 also logs or journals the write request in LUN 3010 which is based on remaining drives 13. A write completion indication is sent to host computer/server 12. In the background, e.g., at idle times or when I/Os are occurring less frequently, the write requests logged or journaled in LUN 3010 are processed such that the write requests are implemented in another LUN 3020 which is also based on remaining drives 13 and which serves as the ultimate mirror copy of SSD 32. In at least some cases, this embodiment performs best when LUN 3010 operates in a RAID mode that has high sequential write performance (e.g., RAID-5).

In another embodiment in which the SSD may be attached as memory or drive 32 or as drive 13A, the external write request is analyzed before it is logged or journaled to LUN 3010. To start, an external write request (I/O) is sent from host computer/server 12 to system 10. System 10 stores the request's user data in SSD 13A. If the analysis determines that the external write request is a sequential write request or may be aggregated into a sequential write request, the write request is not logged or journaled but rather is implemented directly in LUN 3020. Otherwise, system 10 logs or journals the write request in LUN 3010. A write completion indication is sent to host computer/server 12. If necessary, in the background, e.g., at idle times or when I/Os are occurring less frequently, the write requests logged or journaled in LUN 3010 are processed such that the write requests are implemented in LUN 3020. In at least some cases, this embodiment performs best when each LUN 3010, 3020 operates in a RAID mode that has high sequential write performance (e.g., RAID-5).

Avoiding use of a second SSD can provide significant cost savings, especially where the cost of an SSD is 11-30 times the cost of a corresponding conventional hard disk.

In at least some cases, a LUN based on RAID-5 is not excessively slower than an SSD on sequential writes, and so such a LUN may serve as an adequate mirror for sequential writes to the SSD. However, in at least some cases, since a LUN based on RAID-5 is excessively slower than an SSD on random writes, such a LUN may not serve as an adequate mirror for random writes to the SSD. Accordingly, the technique described above is a way to convert all or at least the random or non-sequential write requests into sequential write requests, at least on an interim basis, so that the write completion indication can be sent to the host computer.

The LUN used for logging or journaling may have a cache or be able to take advantage of a cache such that sequential writes are accumulated and/or aggregated.

In case of a failure of the SSD, the LUN-based mirror consists of LUNs 3010, 3020 and performance is limited to the performance of such LUNs. If all logged or journaled write requests in LUN 3010 are processed before the SSD recovers, performance is limited to the performance of LUN 3020. In any case, SSD data may be rebuilt from LUN 3020 aided as necessary by LUN 3010.

For redundancy it is possible to rely solely on the logged or journaled write requests in LUN 3010 without implementing them in another LUN such as LUN 3020; however, in at least some cases LUN 3010 would thereby continue to grow, possibly well beyond the size of the SSD, and possibly substantially so, since there may be multiple changes to the same data.

In at least some cases, LUN 3010 may operate in a RAID-0 mode or any other mode in which multiple hard disks are combined to increase performance.

A number of embodiments and implementations of the invention have been described. Nevertheless, it will be understood that various modifications may be made without departing from the spirit and scope of the invention. Accordingly, other embodiments are within the scope of the following claims.

What is claimed is:

1. A method for use in managing mirroring in data storage system having a fast write device and a slow write device, the method comprising:
   receiving a write I/O having a write data;
   executing the write I/O on the fast write device, the fast write device comprising a solid state drive;
   determining whether the write I/O may be aggregated into a sequential write request;
   based on negative determination, journaling the write I/O in a log stored on a journal LUN residing on the slow write device, wherein the slow write device resides on one or more conventional hard disks and represents at least part of a disk in the data storage system;
   based on positive determination, completing the write I/O by executing the write I/O on a mirror LUN residing on the slow write device after the write I/O is executed on the fast write device;
   indicating, after the write I/O is journaled, that execution of the write I/O is complete; and
   based on the journaling of the write I/O in the log, executing in background the write I/O journaled in the log to the mirror LUN, wherein mirroring is provided for the write data by maintaining first and second copies of the write data so that subsequent read I/O directed to the write data can be serviced from at least one of the fast write device and the mirror LUN residing on the slow write device, wherein the first copy of the write data resides on the fast write device and the second copy of the write data resides on the mirror LUN residing on the slow write device, wherein in the case of a failure of the fast write device, the write data of the fast write device is rebuilt from the mirror LUN residing on the slow write device aided as necessary by the log.

2. The method of claim 1, further comprising:
servicing a read I/O from the fast write device instead of from the mirror LUN residing on the slow write device.

3. The method of claim 1, further comprising:
reporting the write I/O as complete as soon as the write I/O is journaled.

4. The method of claim 1, further comprising:
executing the write I/O on the mirror LUN residing on the slow write device when I/Os are occurring less frequently.

5. The method of claim 1, further comprising:
when I/Os are occurring less frequently, causing the mirror LUN residing on the slow write device to make progress toward representing a full mirror of the fast write device.

6. The method of claim 1, wherein the log comprises a LUN operating in a RAID mode having high performance sequential write capability.

7. The method of claim 1, wherein the slow write device comprises at least a portion of one or more conventional magnetic hard disks.

8. The method of claim 1, further comprising:
analyzing the write I/O before the write I/O is stored in the log.

9. The method of claim 1, further comprising:
determining whether the write I/O may be aggregated into a sequential write request; and
based on determination, avoiding storing the write I/O in the log.

10. The method of claim 1, further comprising:
converting the write I/O to a sequential write request, at least on an interim basis.

11. The method of claim 1, further comprising:
in the case of a failure of the fast write device, servicing read I/Os from the mirror LUN residing on the slow write device aided as necessary by the log.

* * * * *